United States Patent
Zimmer et al.

(10) Patent No.: US 8,312,509 B2
(45) Date of Patent: Nov. 13, 2012

(54) HIGH INTEGRITY FIRMWARE

(75) Inventors: Vincent J. Zimmer, Federal Way, WA (US); George Cox, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 1106 days.

(21) Appl. No.: 11/534,109

(22) Filed: Sep. 21, 2006

(65) Prior Publication Data
US 2008/0077973 A1  Mar. 27, 2008

(51) Int. Cl.
G06F 7/04  (2006.01)
(52) U.S. Cl. .......... 726/2; 726/22; 726/23; 726/24; 726/25; 726/26; 726/27; 711/100
(58) Field of Classification Search .......... 726/2, 22–27; 711/100
See application file for complete search history.

(56) References Cited

U.S. PATENT DOCUMENTS

| | | | |
|---|---|---|---|
| 5,075,842 A | 12/1991 | Lai | |
| 5,075,845 A | 12/1991 | Lai et al. | |
| 5,710,814 A * | 1/1998 | Klemba et al. | 713/173 |
| 5,712,914 A | 1/1998 | Aucsmith et al. | |
| 5,857,144 A * | 1/1999 | Mangum et al. | 455/11.1 |
| 5,878,144 A | 3/1999 | Aucsmith et al. | |
| 6,175,626 B1 | 1/2001 | Aucsmith et al. | |
| 6,253,323 B1 | 6/2001 | Cox et al. | |
| 6,971,003 B1 * | 11/2005 | Mahmoud | 713/2 |
| 6,978,018 B2 | 12/2005 | Zimmer | |
| 2003/0097581 A1 * | 5/2003 | Zimmer | 713/200 |
| 2003/0188173 A1 | 10/2003 | Zimmer et al. | |

FOREIGN PATENT DOCUMENTS

| | | |
|---|---|---|
| JP | 3220647 | 9/1991 |
| JP | 3225455 | 10/1991 |
| WO | 95/33239 | 12/1995 |

OTHER PUBLICATIONS

Office Action 1, Feb. 6, 2009, for CN Application No. CN200710170164.9, 10 pp.
Office Action 1, Apr. 27, 2009, for KR Application No. KR10200796853, 2 pp.
"Advanced Configuration and Power Interface Specification", Revision 3.0, Sep. 2, 2004, 67 pp.
Haar, Dr. M., "Two-Hour Introduction to Operating Systems", Slideshow Presentation, Feb. 22, 2005, 25 pp.
Intel Corp., "Intel Platform Innovation Framework for EFI", [online], 2006, [retrieved on Aug. 9, 2006], retrieved from the Internet at <URL: http://www.intel.com/technology/framework>.
Microsoft Corp., "Visual Studio, Microsoft Portable Executable and Common Object File Format Specification", Revision 8.0, May 16, 2006, 65 pp.
Rootkit.Com, "Rootkit", [online], [retrieved on Aug. 25, 2006], retrieved from the Internet at <URL: http://www.rootkit.com>.

(Continued)

*Primary Examiner* — Kambiz Zand
*Assistant Examiner* — Tongoc Tran
(74) *Attorney, Agent, or Firm* — Barre Law Firm, PLLC

(57) ABSTRACT

Provided are a techniques for determining whether tagged memory is available. In response to determining that tagged memory is available, it is determined whether an Extensible Firmware Interface (EFI) system is implemented. In response to determining that the EFI system is implemented, object descriptors for EFI runtime code and data are allocated and one or more call points from non-tagged memory to tagged memory are provided for use at runtime.

18 Claims, 12 Drawing Sheets

OTHER PUBLICATIONS

Trusted Computing Group, "TCG PC Client Specific Implementation Specification for Conventional BIOS", Version 1.20 Final, Revision 1.00, Jul. 13, 2005, 119 pp.

Trusted Computing Group, "TCG Specification Architecture Overview", Revision 1.2, Apr. 28, 2004, 54 pp.

Intel Corp., "The Intel Platform Innovation Framework for EFI: What's in it for the Developer?", [online], 2006, [retrieved on Aug. 9, 2006], retrieved from the Internet at <URL: http://www.intel.com/cd/ids/developer/asmo-na/eng/dc/pentium4/optimization/208649.htm?page=3>.

UNTED EFI, Inc., "United Extensible Firmware Interface Specification", Version 2.0, Jan. 31, 2006, 33 pp.

U.S. Appl. No. 11/173,851, filed Jun. 30, 2005, entitled "Signed Manifest for Run-Time Verification of Software Program Identity and Integrity", invented by T. Schluesssler, D. Durham, G. Cox, & K. Grewal.

Office Action 2, Aug. 7, 2009, for CN Application No. CN200710170164.9, 5 pp.

Office Action 2, Aug. 7, 2009, for CN Application No. CN200710170164.9, 6 pp. [Translation].

Office Action 1, Mar. 9, 2009, for EP Application No. 07253752.5, 4 pp.

Office Action 1, May 18, 2010, for JP Application No. 2007-245614, 4 pp.

Office Action 2, Aug. 7, 2009, for CN Application No. 200710170164.9, 11 pp.

Response to Office Action 1, Sep. 21, 2009, for EP Application No. 07253752.5, 10 pp.

Office Action 3, Jun. 21, 2010, for CN Application No. 200710170164.9, 8 pp.

Allowed Claims of Notice of Allowance for Application No. KR10-2007-0096853, Oct. 27, 2009, 4 pp.

Final Notice of Reasons for Rejection 1 for Application No. JP2007-245614, Oct. 12, 2010, 4 pp.

Notification to Go Through Formalities of Registration and Notification to Grant Patent Right for Invention for Application No. CN200710170164.9, Nov. 5, 2010, 5 pp.

Response to Office Action 1 for Application No. CN200710170164.9, Jun. 18, 2009, 8 pp. [with markup version of Amended Claims in English].

Response to Office Action 1 for Application No. JP2007-245614, Aug. 16, 2010, 19 pp. [with markup version of Amended Claims in English].

Response to Office Action 1 for Application No. KR10-2007-96853, Jun. 25, 2009, 20 pp. [with clean version of Amended Claims in English].

Response to Office Action 2 for Application No. CN200710170164.9, Oct. 21, 2009, 7 pp. [with clean version of Amended Claims in English].

Response to Office Action 3 for Application No. CN200710170164.9, Oct. 5, 2010, 6 pp. [with clean version of Amended Claims in English].

UNIFIED EFI, Inc., "Unified Extensible Firmware Interface Specification", Version 2.0, Jan. 31, 2006, Total 40 pp. (includes pp. 17-54).

Response to Office Action 2 for JP Application No. 2007245614, dated Jan. 7, 2011, 5 pp. [English Translation].

Decision of Grant and Allowed Claims for Japanese Patent Application No. 2007-245614, mailed Jun. 28, 2011; 6 total pages (including 1 page of English Partial Translation of the Decision of Grant, and 4 pages of English Translation of the Allowed Claims).

* cited by examiner

US 8,312,509 B2

HIGH INTEGRITY FIRMWARE

BACKGROUND

Operating systems provide different levels of access to resources. The levels of access may be associated with "rings". For example, Ring0 is typically the level of access with the most privileges. Other rings include Ring1, Ring2, and Ring3. In operation, for example, programs running in higher numbered rings (e.g., Ring3) request access to the network, which is a resource typically restricted to a lower numbered ring (e.g., Ring0). The use of rings is intended to prevent errant or malicious software (e.g., spyware) running in Ring1 from performing a damaging operation (e.g., accessing passwords on the computer), that may be performed by a Ring0 function reserved for device drivers.

Extensible Firmware Interface (EFI) system may be described as a system that is responsible for a power-on self-test (POST) process, bootstrapping an operating system, and providing an interface between the operating system and physical hardware.

FIG. 1 illustrates a prior art scenario demonstrating the vulnerability of the EFI runtime memory. An operating system 100 (e.g., Microsoft Windows® operating systems, including, Windows® NT 3.1 through Windows® Vista® operating systems) includes Ring0 110 level of access. An Operating System (OS) kernel 120, a Hardware Abstraction Layer 122 (i.e., HAL.DLL), and service calls 124 have Ring0 110 level of access. Additionally, executable Extensible Firmware Interface (EFI) runtime driver images 126 (e.g., EFI runtime code and data) are co-located in Ring0, which is the most privileged operating mode of the operating system 100.

In particular, platform firmware 150 includes EFI runtime driver 1 160, EFI runtime driver 2 162, and EFI runtime driver 3 164. Images of the EFI runtime drivers 160, 162, and 164 are co-located in (i.e., copied to) the executable EFI runtime driver images 126. Also, data 180 from a hardware device 170 is co-located in (i.e., copied to) the executable EFI runtime driver images 126. The EFI runtime driver images 126 include EFI boot service and runtime components and may have the option Read Only Memories (ROMs). Read Only data is in ROM, so ROM is useful in preventing corruption of code in ROM. The ROM is useful to preserve long-term integrity of code in ROM, but once code is loaded from the ROM into memory, the integrity of the memory-relocated images becomes a question.

Having the EFI runtime driver images 126 in the Ring0 110 level of access, along with the OS kernel 120, allows for efficient invocation of the EFI runtime code from the OS kernel 120, but this exposes the EFI runtime driver images 126 to errant or malicious components in the OS kernel 120. That is, errant or malicious components in the OS kernel 120 may access and corrupt the EFI runtime driver images 126. Thus, FIG. 1 illustrates how any Ring0 agent can corrupt the EFI Runtime code and data.

This is a concern that has been popularized by the recent spate of "rootkits" in the press. A rootkit may be described as one or more programs that enable administrator-level access to a computer. Typically, an unauthorized user (e.g., an "attacker") installs a rootkit on a computer after first obtaining user-level access. Once the rootkit is installed, the rootkit enables the attacker to mask intrusion and gain privileged access to the computer. For example, a rootkit may be a kernel-mode virus that can corrupt code and data in memory.

There is real data on the runtime "rootkit" issue and this is not just a security/content protection/Digital Rights Management (DRM) issue. That is, rootkits can afflict any system, not just those that are worried about security/content protection/Digital Rights Management (DRM). There has been growth in the rootkit population. In part, this is because there is financial motivation to support adware and spyware, which may be included in the rootkit. Rootkits are a technical challenge in the community, especially because rootkits defeat current anti-spyware products. It may take several hours to walk a customer through removal of a rootkit and recovery of a computer. For example, there may be more than twelve operations for safemode removal of a rootkit. Additionally, there are new malicious drivers that are moving to boot drivers. That is, the earliest stages of the operating system launch are being infected, whereas most antivirus and other protection software launches much later in the operating system processing.

Today, runtime firmware may be protected by system management mode (SMM). SMM may be described as a mode of certain Intel® microprocessors in which normal execution of code (e.g., the operating system) is suspended and special separate software (e.g., firmware) is executed in high-privilege mode.

Thus, there is a need in the art for improved high integrity firmware.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
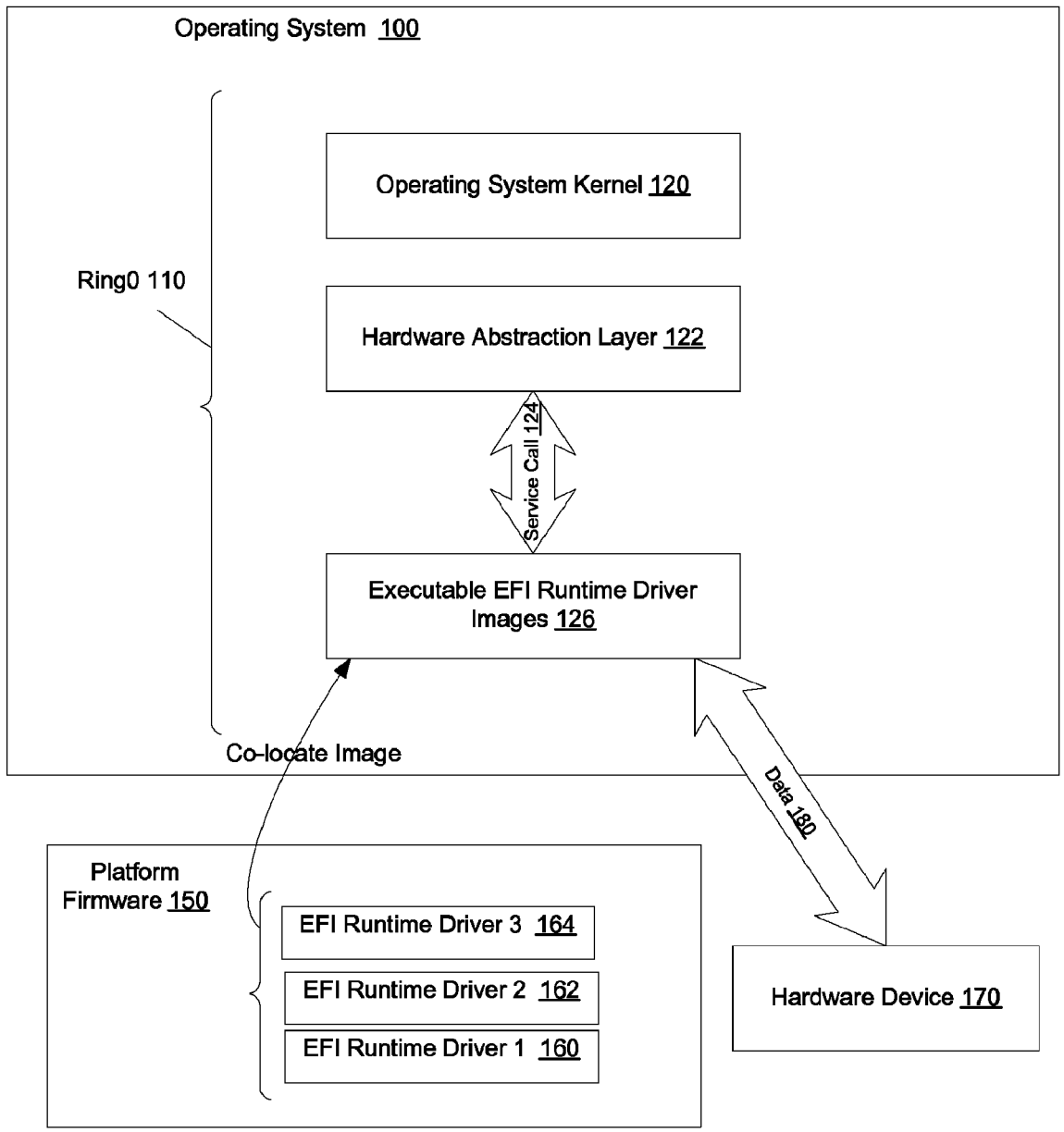
FIG. 1 illustrates a prior art scenario demonstrating the vulnerability of the EFI runtime memory.
Figure 2:
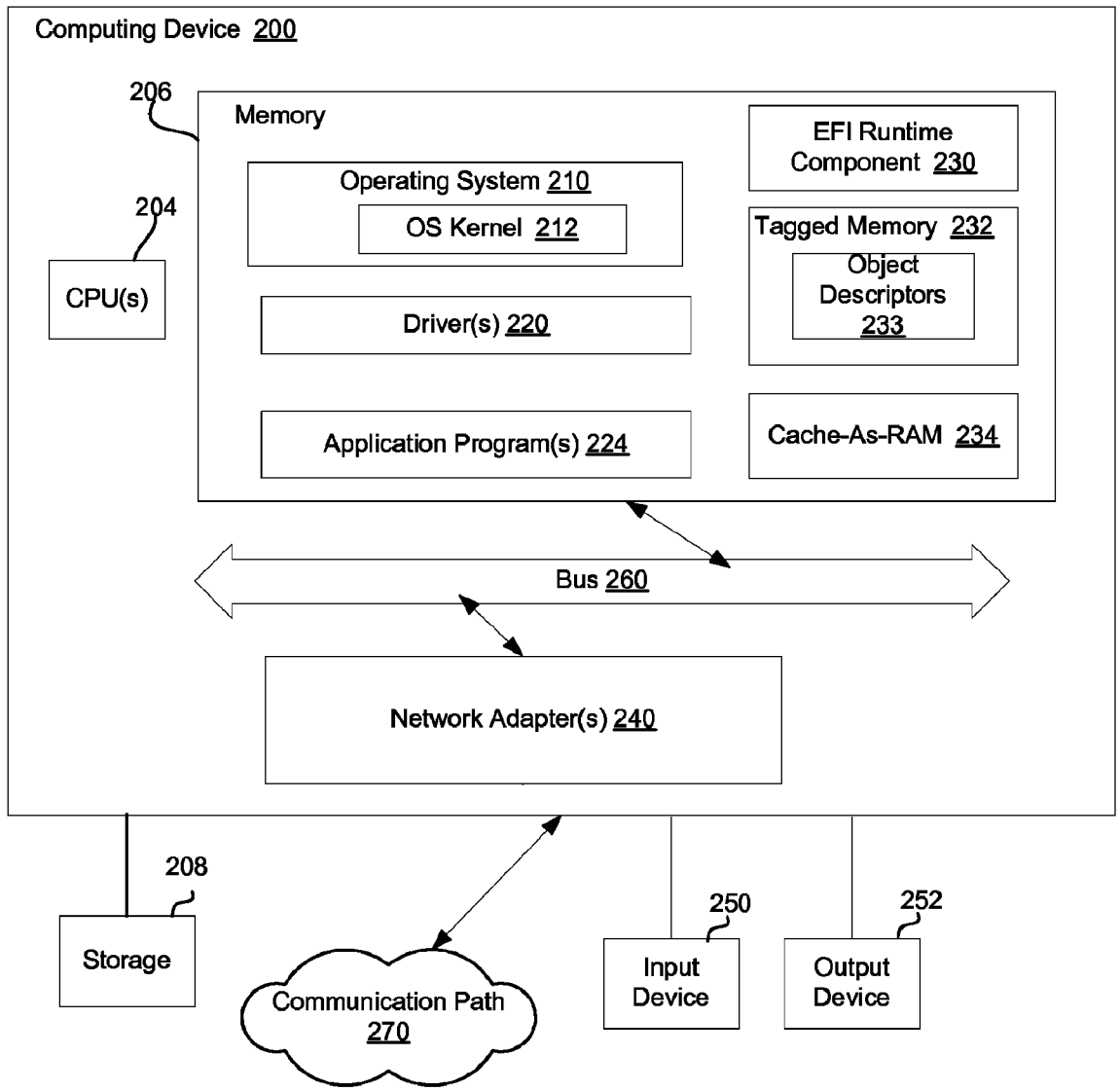
FIG. 2 illustrates details of a computing device 200 in accordance with certain embodiments.

FIG. 2 illustrates details of a computing device 200 in accordance with certain embodiments. The computing device 200 (e.g., a host computer) includes one or more central processing units (CPUs) 204 (i.e., processors), a volatile memory 206, non-volatile storage 208 (e.g., magnetic disk drives, optical disk drives, a tape drive, etc.), and one or more network adapters 240. The one or more network adapters 240 may be said to be coupled to a communication path 270 (e.g., a network).

Memory 206 stores an operating system 210 that includes OS kernel 212. Memory 206 also stores an EFI runtime component 230. In certain embodiments, the EFI runtime component 230 is implemented as firmware. In certain other embodiments, the EFI runtime component 230 may be implemented as hardware, software, firmware or some combination of these. A portion of memory 206 is tagged memory 232. The tagged memory 232 may be described as memory that is populated by pre-OS firmware and contains driver images that are of type EFI Runtime Driver. The tagged memory 232 include object descriptors 233. The object descriptors 233 may be described as "smart" memory that are capable of performing operations (e.g., blocking non-firmware agents from accessing the tagged memory). A portion of memory 206 is non-tagged memory (e.g., the operating system 210 and OS kernel 212 are in non-tagged memory). The memory 206 also includes Cache-as-RAM 234. One or more drivers 220 (e.g., storage drivers or network drivers) and one or more application programs 224 may be stored in memory 206 and are capable of transmitting and retrieving packets from remote computing devices (e.g., host computers or storage systems) over the network 270.

The computing device 200 may comprise any suitable computing device, such as a mainframe, server, personal computer, workstation, laptop, handheld computer, telephony device, network appliance, virtualization device, storage controller, etc. Any suitable CPU 204 and operating system 210 may be used. Programs and data in memory 206 may be swapped into storage 208 as part of memory management operations.

Network 270 may be any type of network such as, for example, a Storage Area Network (SAN), a Local Area Network (LAN), Wide Area Network (WAN), the Internet, an Intranet, etc.

Each network adapter 240 includes various components implemented in the hardware of the network adapter 240. Each network adapter 240 is capable of transmitting and receiving packets of data over the network 270.

Each driver 220 executes in memory 206 and includes network adapter 240 specific commands to communicate with each network adapter 240 and interface between the operating system 210 and each network adapter 240. Each network adapter 240 or driver 220 implements logic to process packets, such as a transport protocol layer to process the content of messages included in the packets that are wrapped in a transport layer, such as Transmission Control Protocol (TCP) and/or Internet Protocol (IP), the Internet Small Computer System Interface (iSCSI) (IETF RFC 2347, February 2003), Fibre Channel (American National Standards Institute (ANSI) X3.269-199X, Revision 012, Dec. 4, 2995), or any other suitable transport layer protocol.

The storage 208 may comprise an internal storage device or an attached or network accessible storage. Programs in the storage 208 may be loaded into the memory 206 and executed by the CPU 204. An input device 250 is used to provide user input to the CPU 204, and may include a keyboard, mouse, pen-stylus, microphone, touch sensitive display screen, or any other suitable activation or input mechanism. An output device 252 is capable of rendering information transferred from the CPU 204, or other component, such as a display monitor, printer, storage, etc.

Various structures and/or buffers (not shown) may reside in memory 206 or may be located in a storage unit separate from the memory 206 in certain embodiments.

In certain embodiments, the EFI runtime component 230 and tagged memory 232 with object descriptors 233 may be implemented in integrated circuit components on a system board of a computing device 200. Thus, the EFI runtime component 230 and tagged memory 232 with object descriptors 233 may be said to be coupled to a system board. In alternative embodiments, the EFI runtime component 230 and tagged memory 232 with object descriptors 233 may be implemented in integrated circuit components on an expansion card that may be inserted into an expansion card slot on a system board of a computing device 200. Thus, the EFI runtime component 230 and tagged memory 232 with object descriptors 233 may be said to be coupled to an expansion board.

Figure 3:
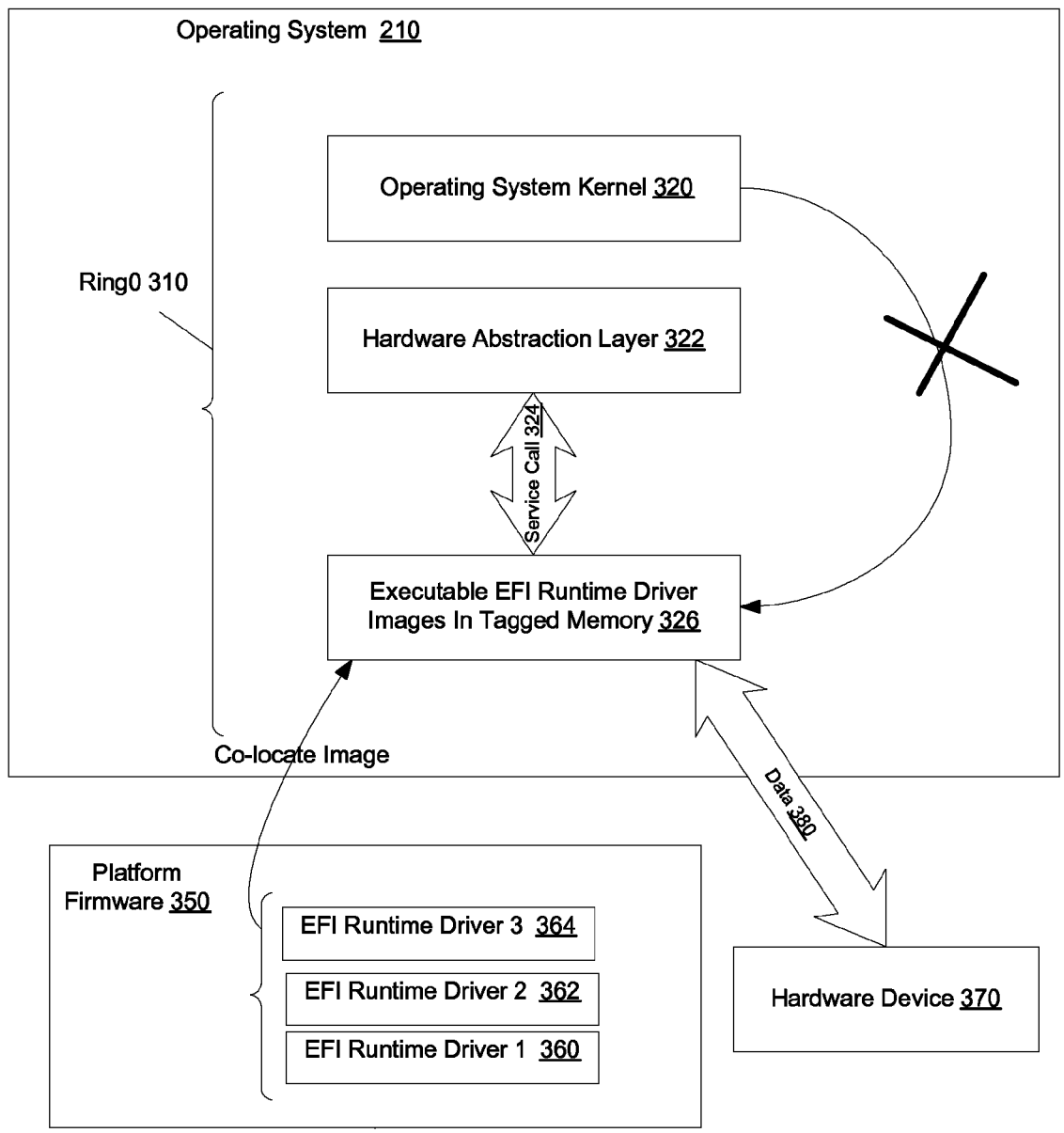
FIG. 3 illustrates how EFI runtime driver images are protected in accordance with certain embodiments.

FIG. 3 illustrates how EFI runtime driver images are protected in accordance with certain embodiments. In FIG. 3, the operating system 210 includes Ring0 310 level of access. An Operating System (OS) kernel 320, a Hardware Abstraction Layer 322 (i.e., HAL.DLL), and service calls 324 have Ring0 310 level of access. Additionally, executable Extensible Firmware Interface (EFI) runtime driver images in tagged memory 326 (including, EFI runtime code and data) are co-located in Ring0, which is the most privileged operating mode of the operating system 300.

In particular, platform firmware 350 includes EFI runtime driver 3 360, EFI runtime driver 2 362, and EFI runtime driver 3 364. Images of the EFI runtime drivers 360, 362, and 364 are co-located in (i.e., copied to) the executable EFI runtime driver images in tagged memory 326. Also, data 380 from a hardware device 370 is co-located in (i.e., copied to) the executable EFI runtime driver images in tagged memory 326.

In FIG. 3, because the EFI runtime driver images tagged memory 326 in the Ring0 310 level of access, errant or malicious components in the OS kernel 320 (e.g., bugs in the operating system) are not able to corrupt the EFI runtime drivers 360, 362, 364 or other code and data in the executable EFI runtime driver images in tagged memory 326. However, valid invocations of the EFI runtime code from the OS kernel 320 may be made. Thus, FIG. 3 illustrates how embodiments protect EFI runtime code and data from corruption.

FIGS. 4-7 illustrate emergent CPU capabilities in accordance with certain embodiments.

Figure 4:
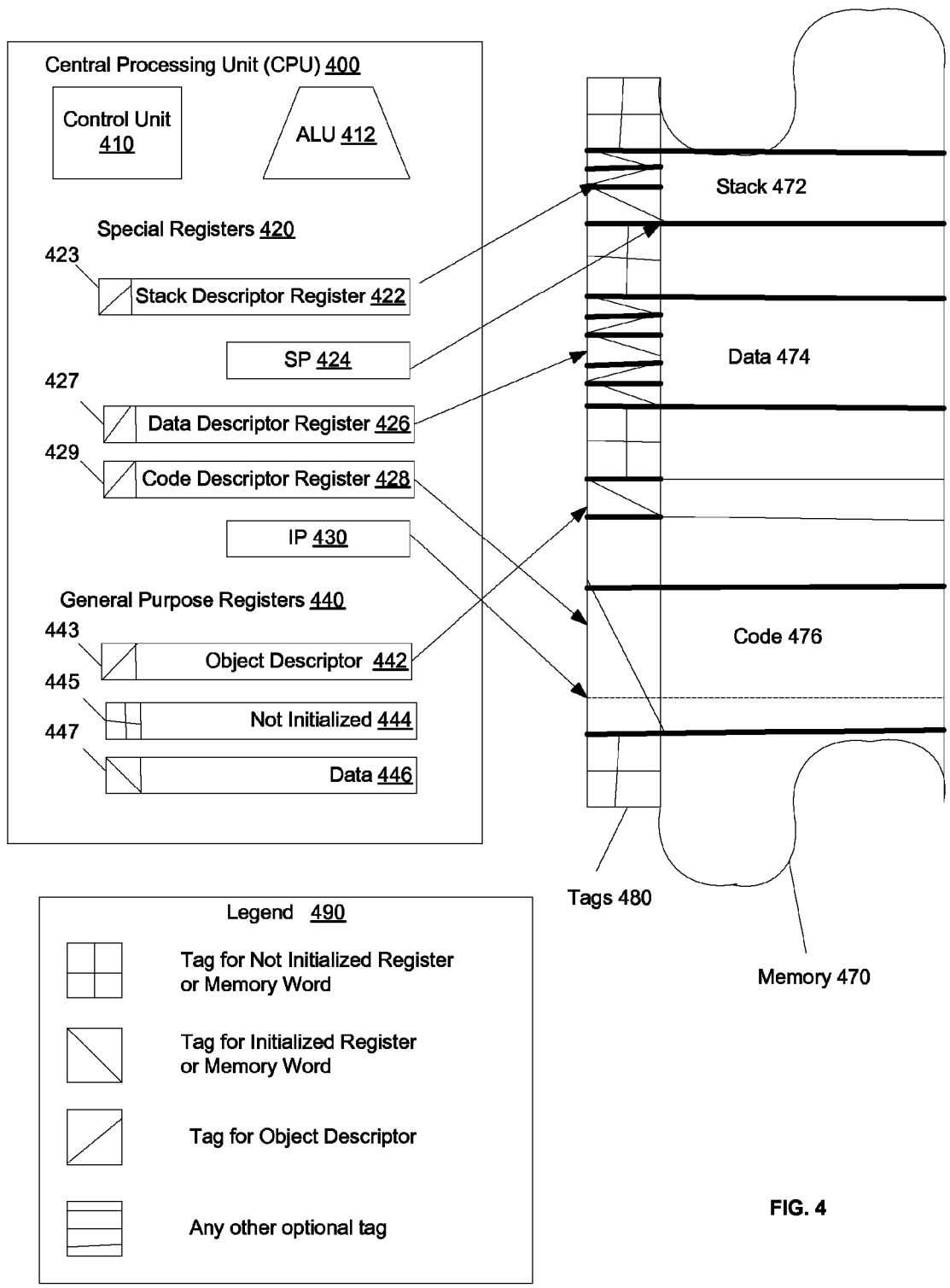
FIG. 4 illustrates an example of use of tagged memory in accordance with certain embodiments.

FIG. 4 illustrates an example of use of tagged memory in accordance with certain embodiments. Legend 490 indicates sample tags and their meanings. Although four tags are shown, other tags are within the scope of the embodiments. A Central Processing Unit (CPU) 400 includes a control unit 410 and an Arithmetic Logic Unit (ALU) 412. Special registers 420 include a stack descriptor register 422 with a tag 423 that indicates that this is an object descriptor, a Stack Pointer (SP) register 424, a data descriptor register 426 with a tag 427 that indicates that this is an object descriptor, a code descriptor register 428 with a tag 429 that indicates that this is an object descriptor, and an Instruction Pointer 430. General purpose registers 440 include an object descriptor 442 with a tag 443 that indicates that this is an object descriptor, a not initialized element 444 with a tag 445 that indicates that this element is a not initialized register or memory word, and data 446 with a tag 447 that indicates that this is an initialized register or memory word. Memory 470 includes stack 472, data 474, and code 476. Memory 470 also includes tags 480. The tags 480 correspond to the tags associated with the special registers 420 and general purpose registers 440.

Figure 5:
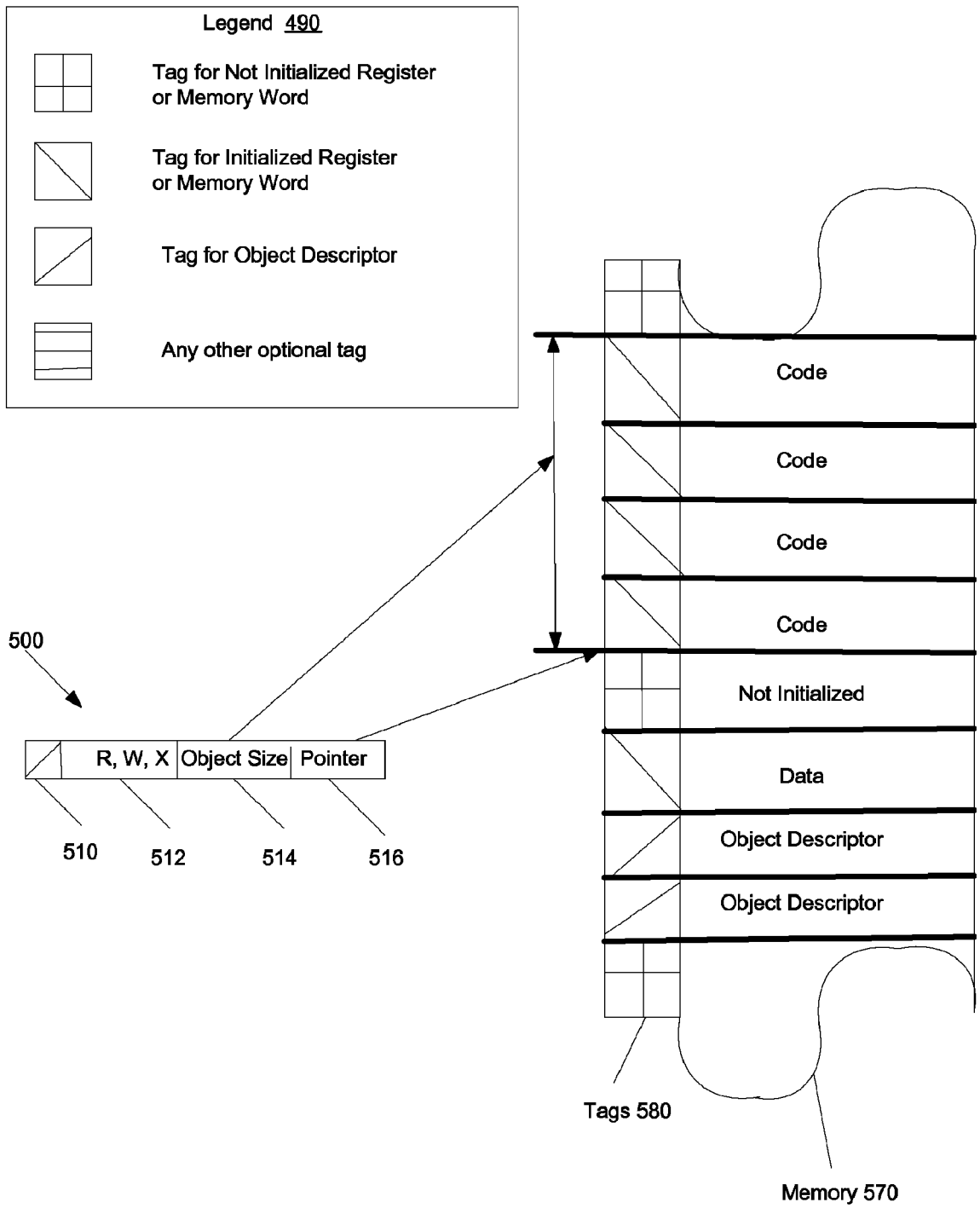
FIG. 5 illustrates an object descriptor and tagged memory in accordance with certain embodiments.

FIG. 5 illustrates an object descriptor 500 and tagged memory 570 in accordance with certain embodiments. An object descriptor 500 may be placed anywhere in tagged memory 570, on any CPU's register, and in Virtual Memory (VM). An object descriptor 500 includes a tag 510 (e.g., tag bits) and encapsulates a description of an object in memory by providing access rights 512, object size 514, and a pointer 516 to memory 570. The tag 510 indicates that this is an object descriptor. The object descriptor 500 provides fine grained access control for Read ("R"), Write ("W"), and Execute ("X"), which is close to a high-level language semantics (as compared to VM per page control without any size checking). In certain embodiments, only a Trusted Computing Base (TCB) (with both hardware and software components) may initialize and modify the content of the object descriptor 500. A Trusted Computing Base may be described as a minimal amount of code to be trusted (e.g., in the case of setting up these early object descriptors, the TCB would include initialization boot firmware).

An application may access memory 570 (both directly and indirectly) through the object descriptors available to that application (e.g. for load, store, jump, call, etc.). In certain embodiments, hardware controls each access and generates an interrupt in case of access rights or object size violation.

Figure 6:
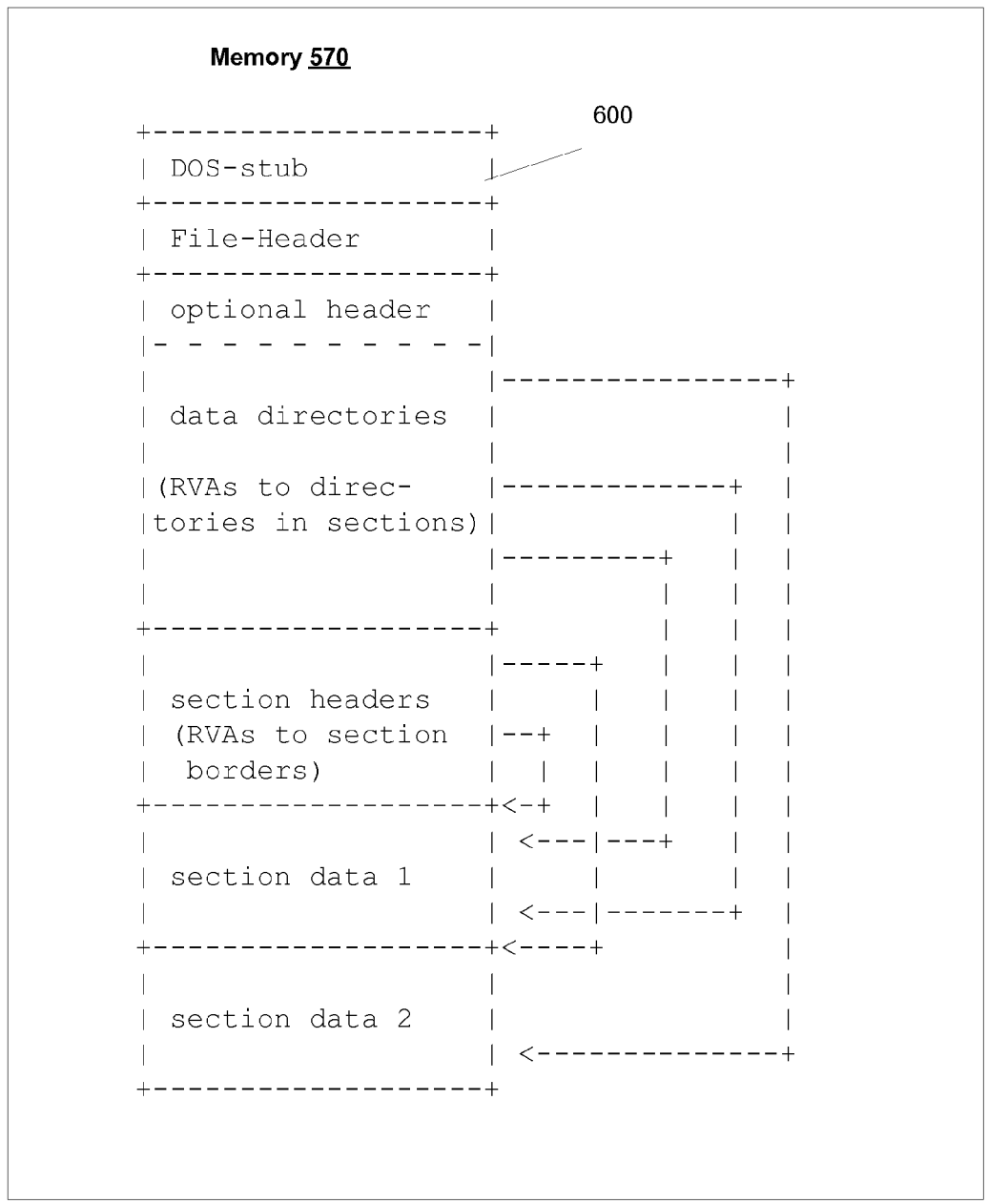
FIG. 6 illustrates an EFI image stored in memory in accordance with certain embodiments.

FIG. 6 illustrates an EFI image 600 stored in memory 570 in accordance with certain embodiments. In certain embodiments, the EFI image is a Portable Executable and Common Object File Format (PE/COFF) executable. Different object descriptors may be allocated for different parts of the EFI image. As an example, the EFI image 600 may be a RuntimeServices.efi executable that is launched during the pre-OS, boot-services phase of EFI and continues to exist co-equal with the OS kernel 212.

Figure 7:
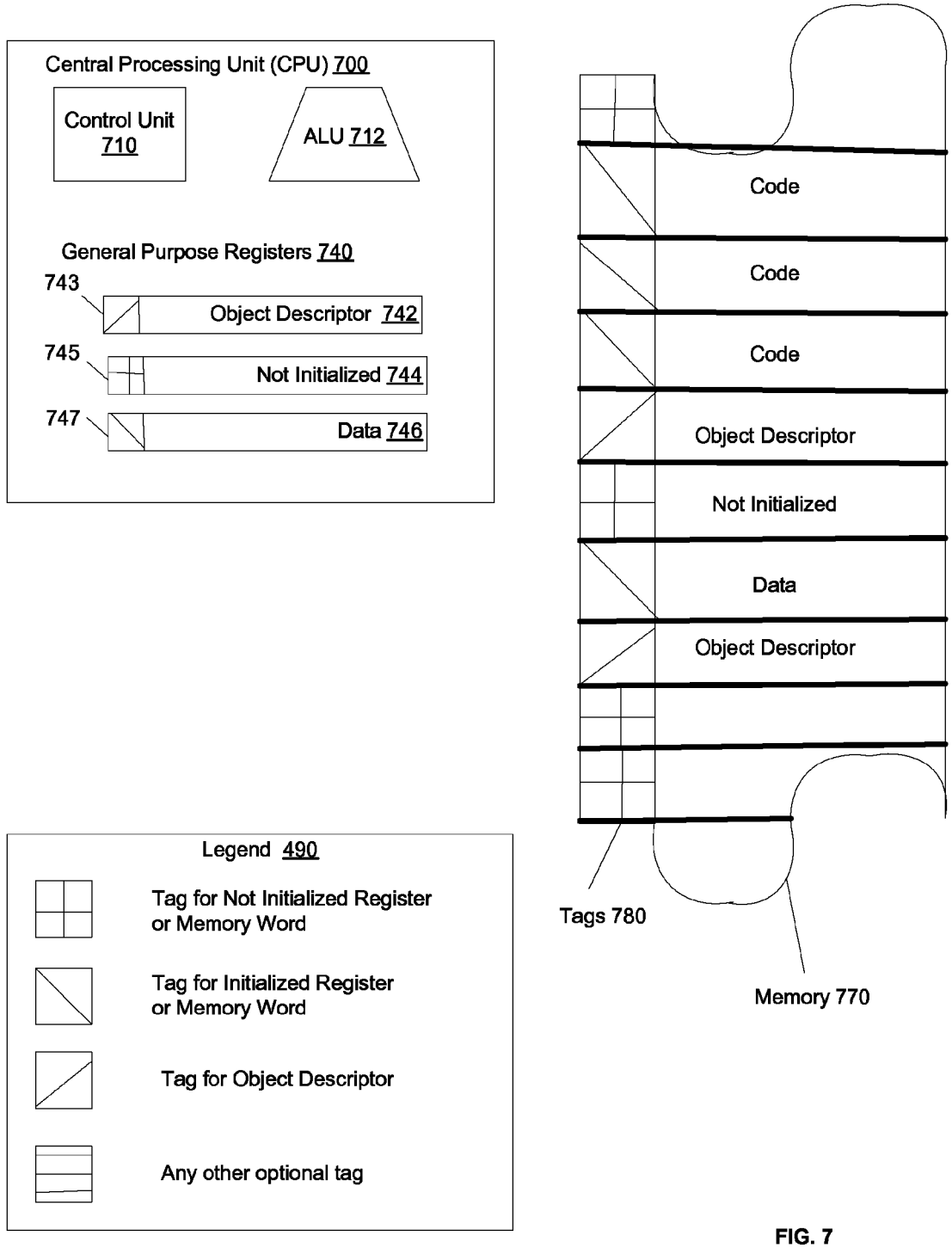
FIG. 7 illustrates yet another example of use of tagged memory in accordance with certain embodiments.

FIG. 7 illustrates another example of use of tagged memory in accordance with certain embodiments. In FIG. 7, a Central Processing Unit (CPU) 700 includes a control unit 710 and an Arithmetic Logic Unit (ALU) 712. General purpose registers 740 include an object descriptor 742 with a tag 743 that indicates that this is an object descriptor, a not initialized element 744 with a tag 745 that indicates that this element is a not initialized register or memory word, and data 746 with a tag 747 that indicates that this is an initialized register or memory word. Memory 770 includes code, data, object descriptors, and not initialized portions. Memory 770 also includes tags 780.

Figure 8:
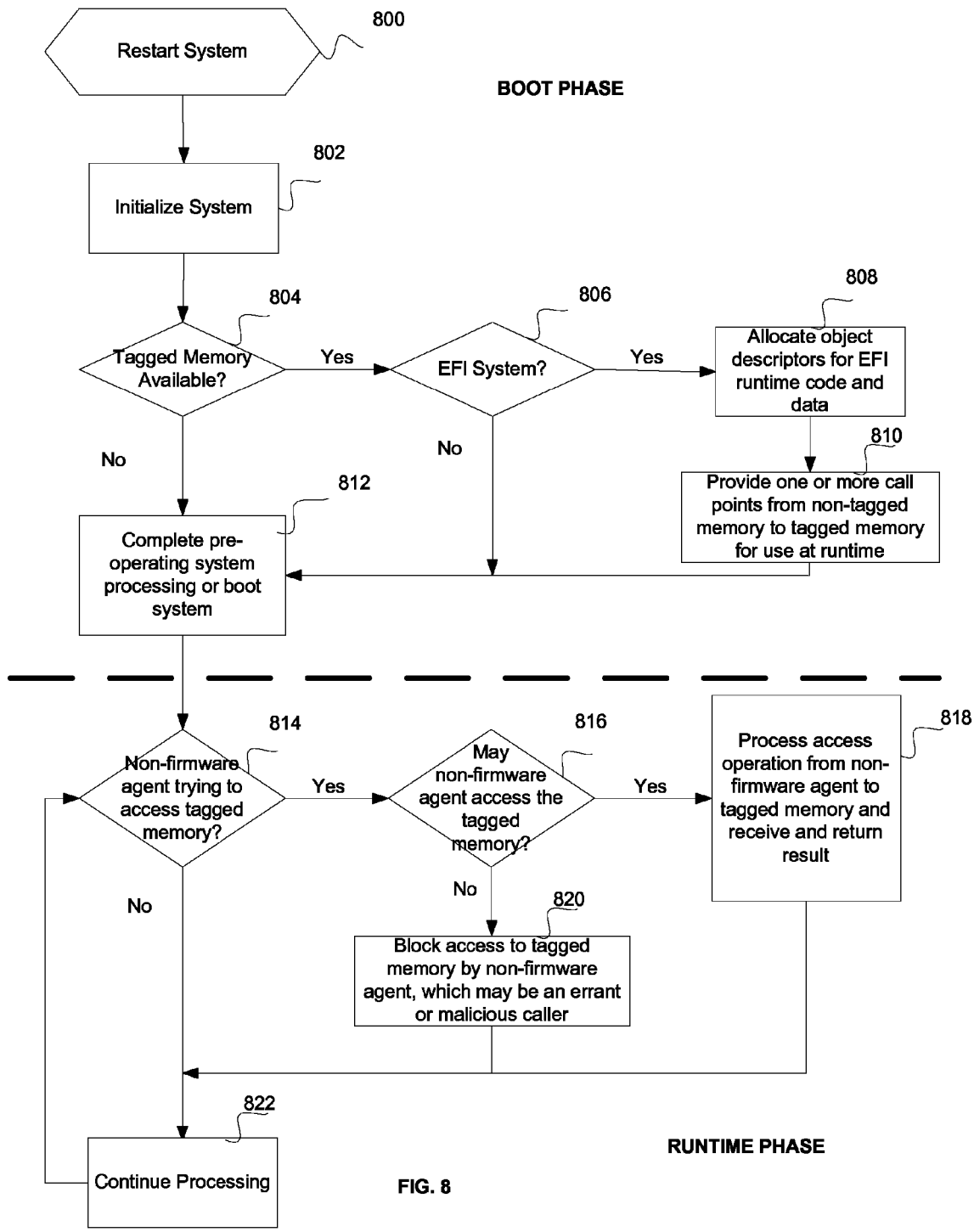
FIG. 8 illustrates logic performed by the EFI runtime component for protecting EFI runtime code and data in accordance with certain embodiments.

FIG. 8 illustrates logic performed by the EFI runtime component 230 for protecting EFI runtime code and data in accordance with certain embodiments. Control begins at block 800 with the system restarting (e.g., because a power switch has been turned on). "System" refers to a computing platform. In block 802, the system is initialized. In block 804, the EFI runtime component 230 determines whether tagged memory 232 is available. If so, processing continues to block 806, otherwise, processing continues to block 812.

In block 806, the EFI runtime component 230 determines whether an EFI system is implemented. If so, processing continues to block 808, otherwise, processing continues to block 812. In block 808, the EFI runtime component 230 allocates object descriptors for the EFI runtime code and data. Each object descriptor includes a tag indicating that this is an object descriptor. The processing of block 808 includes the EFI runtime component 230 initializing each register to include a tag that indicates whether the register is initialized, not initialized, or stores an object descriptor. In block 810, the EFI runtime component 230 provides one or more call points from non-tagged memory to tagged memory for use at runtime. For example, in FIG. 3, the hardware abstraction layer 322 is in a non-tagged memory, while the executable EFI runtime driver images 326 are in tagged memory, so service call 324 may be described as a call point from non-tagged memory to tagged memory. A call point may be described as a publicly described function call, such as EFI runtime services calls.

In block 812, the EFI runtime component 230 completes the pre-operating system processing or boot system processing. Thus, blocks 800-812 represent a boot phase, while blocks 814-822 represent a runtime phase.

In block 814, one or more of the object descriptors 233 determine whether a non-firmware agent is attempting to access tagged memory 232. A non-firmware agent may be described as code that is not loaded from the platform firmware/platform ROM. A non-firmware agent may include, but is not limited to, a component of the OS executive or a kernel mode driver/service. If so, processing continues to block 816, otherwise, processing continues to block 822. In block 816, one or more of the object descriptors 233 determine whether the non-firmware agent may access the tagged memory 232 based on access rights in the object descriptor associated with the tagged memory 232 to be accessed (i.e., determines whether this is a legal memory location for EFI runtime driver images). If so, processing continues to block 818, otherwise, processing continues to block 820. In block 818, the EFI runtime component 230 processes an access operation from the non-firmware agent to the tagged memory 232 and receives and returns a result. In certain embodiments this occurs through a stub (i.e., there is a certain non-tagged piece of EFI runtime code (that is part of the EFI runtime component 230)) that acts as an intermediary between the EFI runtime component 230 and the non-tagged OS kernel 212. In block 820, one or more of the object descriptors 233 blocks access to the tagged memory 232 by the non-firmware agent, which may be an errant or malicious caller. In block 822, processing continues, and, when a non-firmware attempts to access EFI runtime tagged memory 232, processing loops back to block 814.

Figure 9:
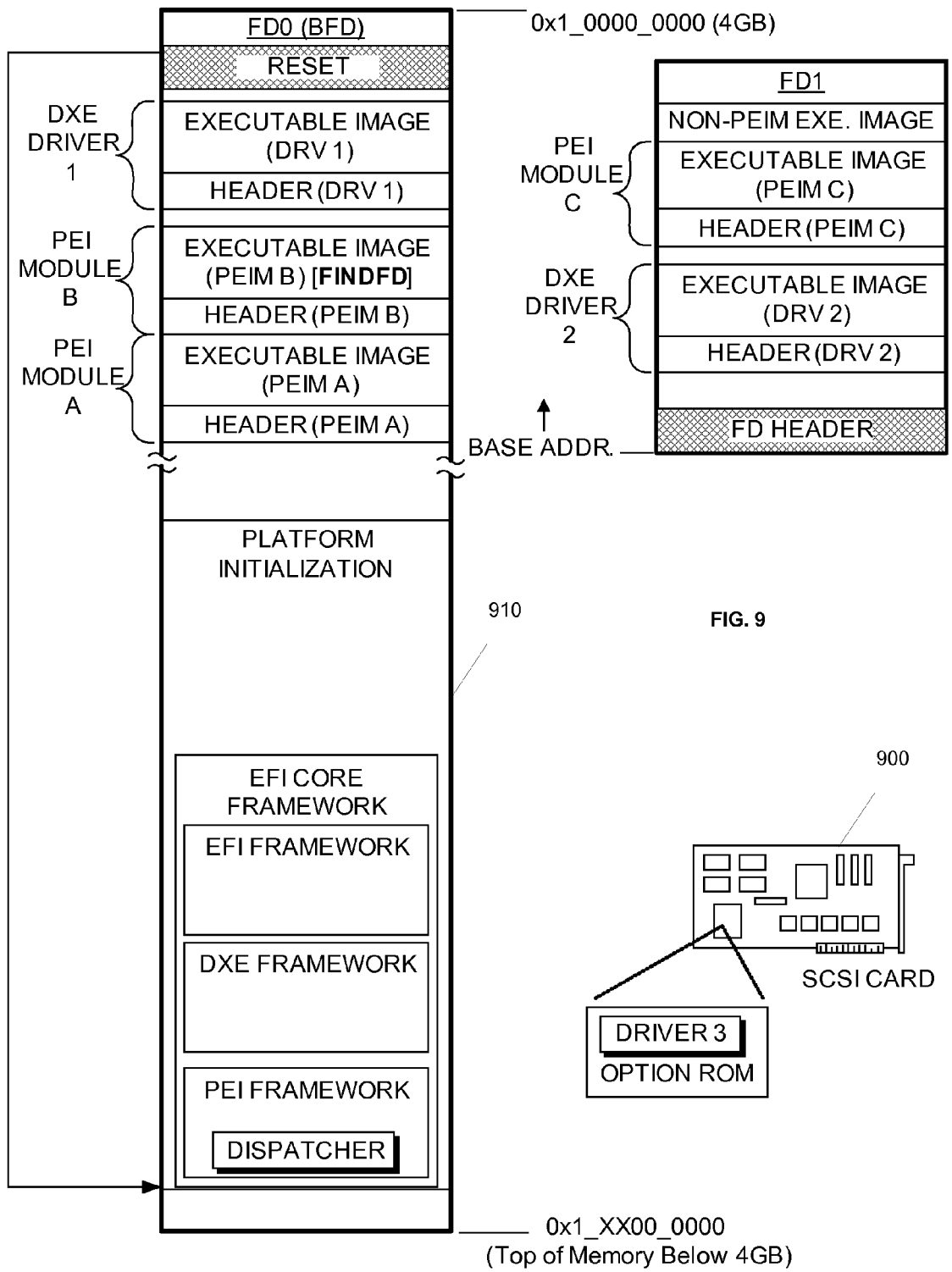
FIG. 9 illustrates an example of how EFI components are protected in accordance with certain embodiments.

FIG. 9 illustrates an example of how EFI components are protected in accordance with certain embodiments. In this example, it is possible that a Small Computer System Interface (SCSI) card 900 that includes a malicious driver3 is plugged into a computer system. With the example of FIG. 9, the framework for implementing EFI consists of two major phases: Pre-EFI Initialization (PEI) and Driver Execution Environment (DXE). The pre-EFI initialization phase is performed by a plurality of PEI modules A, B, and C. The driver execution environment phase is performed by a plurality of drivers: DXE driver1 and DXE driver2. The platform initialization portion of memory 910 includes an EFI core framework that is stored in tagged memory, separate from the PEI modules and DXE drivers. The EFI core framework includes an EFI framework, a DXE framework, and a PEI framework.

Figure 10:
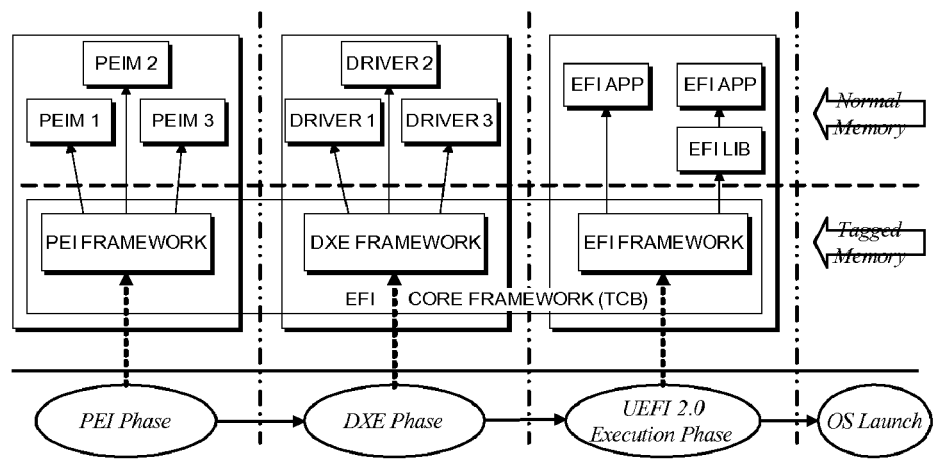
FIG. 10 illustrates Pre-EFI Initialization (PEI), Driver Execution Environment (DXE), and EFI execution phases in accordance with certain embodiments.

FIG. 10 illustrates PEI, DXE, and EFI execution phases 1000 in accordance with certain embodiments. With embodiments, the PEI framework, DXE framework, and EFI framework are located in tagged memory, while PEI modules, DXE drivers, and EFI applications and libraries are located in untagged ("normal") memory. In certain embodiments, code from the platform firmware that is "trusted" and is part of the TCB is put into the EFI runtime tagged memory. This allows code from the system board vendor to be isolated from drivers loaded from third party adapter cards, etc. This same isolation exists at runtime such that the EFI runtime code is isolated from the system board and can be isolated from any of the EFI-aware operating systems that are subsequently launched.

Thus, embodiments enable the party that delivers the system board, such as an Original Equipment Manufacturer (OEM) to be sure that their code that ships in the ROM on the board will not be corrupted/infected by other pre-OS code or the OS.

Thus, FIGS. 9 and 10 illustrate how embodiments may be applied to the flow of firmware components prior to the launch of the operating system. FIG. 9 has the Core Framework in ROM that is then loaded into EFI runtime tagged memory. In FIG. 10, the bottom half of the flow designates the tagged and protected pre-OS framework code.

Figure 11:
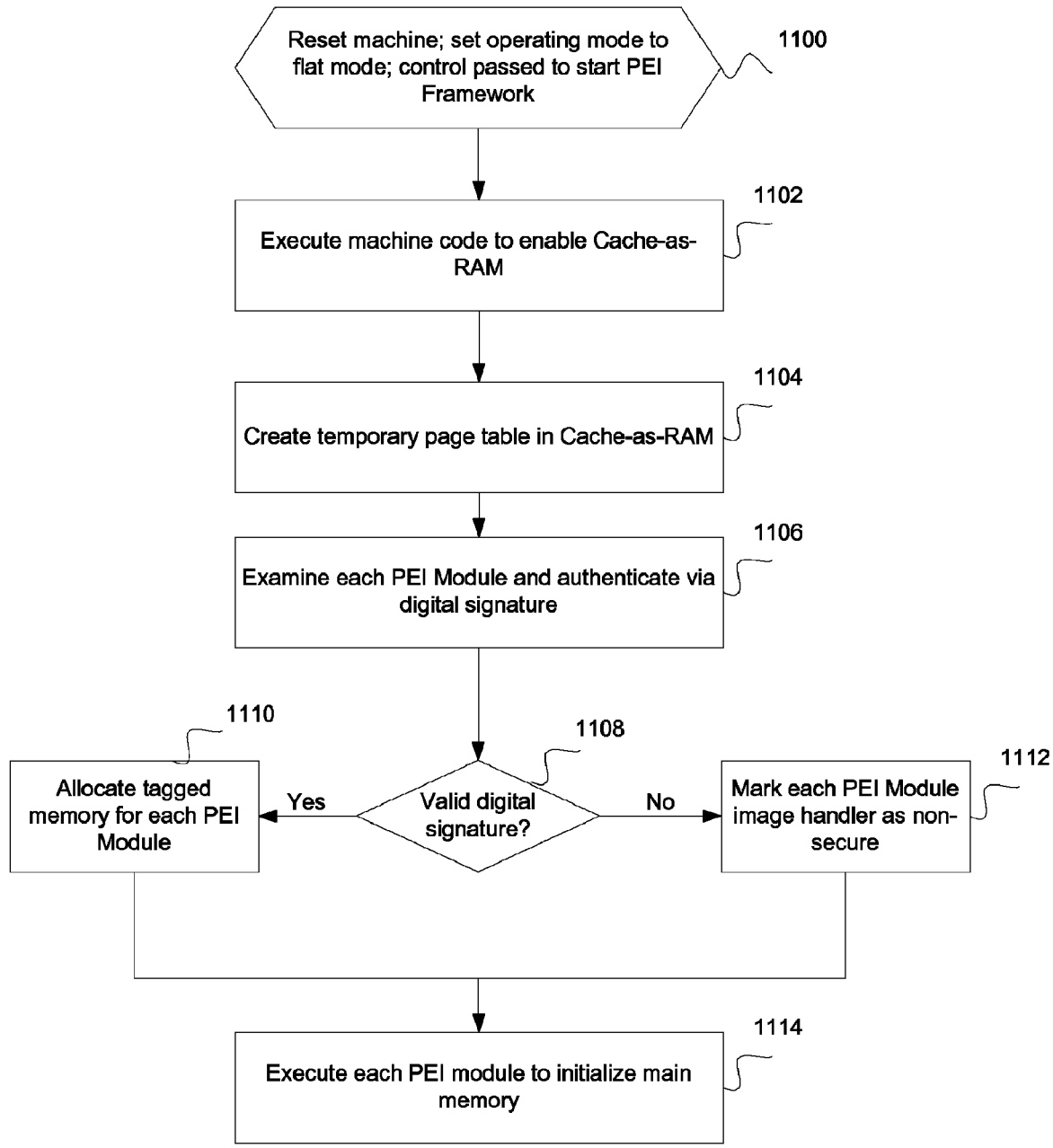
FIG. 11 illustrates use of tagged memory for pre-boot in accordance with certain embodiments.

FIG. 11 illustrates use of Tagged memory for pre-boot in accordance with certain embodiments. Control begins at block 1100 with a system being reset; the operating mode being set to flat mode (i.e., protected mode with data/code set for 0-4 GB mapping), and control being passed to start the PEI framework. In block 1102, machine code is executed to enable Cache-as-RAM 234. In block 1104, a temporary page table is created in the Cache-as-RAM. In block 1106, the PEI core and any PEI Modules that help perform authentication that are part of the PEI TCB and are in Tagged memory ("PEI component") examines each PEI module and authenticates each PEI module via a digital signature. In block 1108, the PEI component determines whether this is a valid digital signature. If so, processing continues to block 1110, otherwise, processing continues to block 1112. In block 1110, the PEI component allocates tagged memory 232 for each PEI module. In block 1112, the PEI component marks each PEI module image handler as non-secure. In block 1114, each PEI module is executed to initialize main memory.

Figure 12:
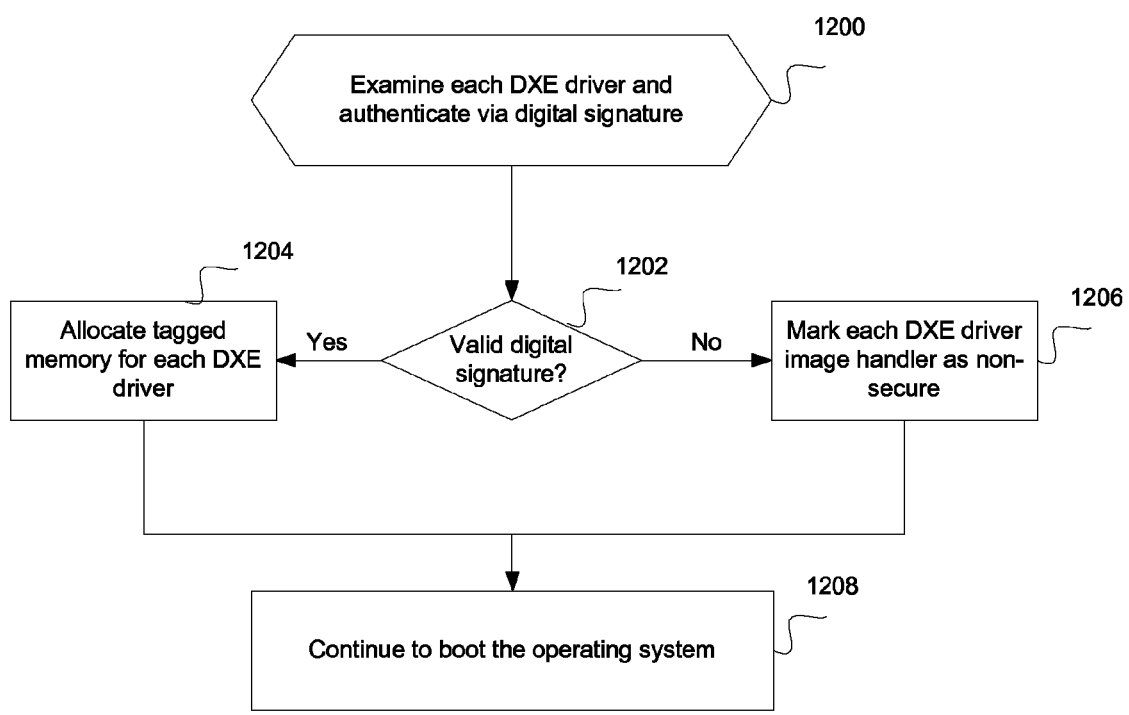
FIG. 12 illustrates logic for pre-boot processing in accordance with certain embodiments.

FIG. 12 illustrates logic for pre-boot processing in accordance with certain embodiments. In certain embodiments, one or more DXE drivers may be loaded as an EFI runtime driver. Thus, the authentication/tagging in DXE leads to the OS present embodiment. In block 1200, the DXE Core/Foundation and any DXE authentication drivers that are part of the DXE TCB and are in Tagged memory ("DXE component") examines each DXE driver and authenticates each DXE driver via a digital signature. In block 1202, the DXE component determines whether this is a valid digital signature. If so, processing continues to block 1204 otherwise, processing continues to block 1206. In block 1204, the DXE component allocates Tagged memory for each DXE driver. In block 1206, the DXE component marks each DXE driver image handler as non-secure. In block 1208, the operating system boot processing continues.

Embodiments provide a high integrity firmware, both pre-boot and runtime. Embodiments use "capabilities" or "tagged memory" to isolate code and data from other code operating at the same privilege level.

Embodiments help preserve the integrity of in-memory images loaded from ROM.

Embodiments enable ensuring that an Original Equipment Manufacturer (OEM) boot-service code is not corrupted by errant pre-OS applications and OS loaders. The co-location of disparate elements leads to trust and reliability issues going forward. In certain embodiments, to set the object descriptors up, the logic of blocks 800-810 of FIG. 8 runs very early in the boot-flow, preferably in a Core-Root of Trust for Measurement (CRTM), such as the SEC or PEI phase. CRTM may be described as the code that starts up the Trusted Platform Module (TPM) and is part of the Trusted Building Block (TBB) for a Trusted Computing Platform. SEC may be described as (i.e., the very initial code that executes upon a system restart and does the "protected mode"/cache-as-RAM initialization Flash block locking may be used to ensure that the object descriptors covering the EFI preboot core and runtime are not perturbed by untrusted code. That is, the flash memory is locked using a hardware feature of NOR flash to ensure that when the TCB passes control to other agents, the flash will be read-only (i.e., no one can tamper with the flash contents). Alternatively, firmware reserved memory or other read-only resource provisioned by the early boot firmware may be used. In either of the aforementioned cases, the EFI firmware marks the memory used by the firmware for the object descriptor storage as "firmware reserved" in both the Advanced Configuration and Power Interface (ACPI) memory map (with an Int15h E820 call in Basic Input/Output System (BIOS) to report a memory map to an operating system (Advanced Configuration and Power Interface Specification, Revision 3.0, Sep. 2, 2004)) and EFI memory map (with a GetMemoryMap call (in order to avoid having the operating system inadvertently or maliciously corrupting the store.

Embodiments are usable during the boot-services, pre-boot phase of the platform evolution. In particular, there may be untrusted and possibly errant option ROMs and pre-boot applications against which the platform firmware is to be guarded. An Option ROM may be described as a BIOS extension or EFI driver that is on a Host Bus Adapter (HBA) (i.e., a card that plugs into a system) so that an independent hardware vendor may ship code with an HBA that can be used to help boot a system. Platform firmware/EFI loads the driver and lets the driver install driver services. Since a driver on an HBA comes from a possibly untrustworthy third party, it is important to use Tagged memory isolation to keep the lower-integrity driver from perturbing the pre-OS TCB.

Embodiments armor the boot services PEI and DXE foundations of the Intel Platform Innovation Framework for the Extensibility Firmware Interface ("Framework") or any other firmware that is built pursuant to the Framework standards.

Also, embodiments may be used along with other practices in firmware deployment, including, but not limited to, signed flash updates, locking SMRAM and the flash prior to running code from an unknown source, ensuring that trusted code is signed by a source known to the platform authority/owner prior to invocation, measurement of components/trusted boot with a Trusted Platform Module (TPM), and authenticating the operator prior to any configuration updates or changes. The use of tagged memory may be used alone or to complement one or more of these other aspects of a robust, high-integrity platform firmware construction.

Embodiments provide tagged memory that is designed for OS data structure protection. Additionally, embodiments handle pre-OS and runtime firmware/OS runtime isolation. Embodiments provide protection and isolation among operating system components, such as a "secure file system or secure inodes" in an operating system. Embodiments allow for exploiting this capability for platform firmware.

Embodiments are useful for protecting read-write data and code-in-memory.

Embodiments enable capabilities to be added in a backward-compatible fashion. As such, industry standard firmware, both boot-services and runtime, may be recompiled such that the industry standard firmware is advantaged by the use of tagged memory. Embodiments provide a "type-safe" CPU because of its applicability to Managed Runtime Environments (MRTE's) where type-safety of the code is used for isolation and software elements do not need ring protection. This "lack of ring protection" for the software and a highly stylized software interface for isolation is also applicable for technologies under the Unified EFI Forum, including EFI and the Framework-based specifications. That is, today UEFI does not have isolation between drivers and core platform firmware. This is an integrity problem because platform firmware on the system board should be more trusted/higher integrity than firmware loaded from HBA or disk. Hardware isolation is needed for this integrity guarantee. At OS runtime, page-tables and other protection hardware are owned by OS kernel; therefore, new tagged hardware that is reserved for use by platform firmware runtime is used to ensure that higher integrity EFI runtime code is not corrupted by malicious or errant OS runtime code.

Embodiments allow for Ring0 co-location to continue, but tag memory appropriately. With embodiments, even a Ring0 OS loader cannot corrupt an EFI core.

At runtime, the EFI firmware delegates protection of the firmware runtime code and data to the OS kernel. With embodiments, the EFI firmware runtime can be protected through appropriate object descriptors delegated in the pre-OS processing.

Embodiments allow for the tagged-memory variant of the EFI runtime to coexist with the OS and perform many scenarios for the OEM, which are today implemented in SMM w/o compromising code integrity.

Embodiments protect the EFI runtime from rootkits/OS kernel-mode malware.

Trust may be said to encompass reliability, safety, confidentiality, integrity, and availability. Security may be said to encompass confidentiality, integrity, and availability. Embodiments address integrity, and, therefore, address both trust and security. Embodiments are applicable to the enterprise. An enterprise may be described as a market segment (e.g., a business that buys and uses computers), as distinguished from a home user because of the "reliability" aspects of trust and security.

Embodiments may be used to ensure that manycore and multicore processor-based platforms have a way to deploy high-integrity code flows from platform firmware.

Embodiments use a hardware capability intended for OS component isolation to provide a bad option ROM, rootkit, kernel armour, without upsetting the present software ecosystem. That is, platform firmware may use these tags, but the OS kernel does not have to be re-compiled/updated to work with embodiments. New system boards and firmware can work with old OS kernels (e.g., Windows® XP or Windows® Server 2003 operating systems). Embodiments provide firmware isolation for older and newer operating systems, This is good for OEMs since each system board typically supports a wide range of old and new operating system loads.

Intel is a registered trademark or common law mark of Intel Corporation in the United States and/or other countries. Windows and Vista are registered trademarks or common law marks of Microsoft Corporation in the United States and/or other countries.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. A "machine readable medium" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The illustrated operations of FIGS. 8, 11, and 12 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or limiting. Many modifications and variations are possible in light of the above teachings.

What is claimed is:

1. A method for supporting runtime firmware code, the method comprising:
   determining whether tagged memory is available, wherein the tagged memory comprises tags associated with portions of the tagged memory;
   in response to determining that tagged memory is available, determining whether an Extensible Firmware Interface (EFI) system is implemented;
   in response to determining that the EFI system is implemented;
   allocating object descriptors for EFI runtime code and data in the tagged memory; and
   providing one or more call points from non-tagged memory to the tagged memory for use at runtime; and
   during run-time, using the object descriptors associated with the tagged memory to determine whether a non-firmware agent may access the tagged memory storing the EFI runtime code and data.

2. The method of claim 1, further comprising:
   determining that the non-firmware agent is attempting to access the tagged memory; and
   in response to determining that the non-firmware agent may access the tagged memory, processing an access operation from the non-firmware agent.

3. The method of claim 2, further comprising:
in response to determining that the non-firmware agent may not access the tagged memory, blocking access to the tagged memory by the non-firmware agent.

4. The method of claim 3, wherein the non-firmware agent comprises one of an errant caller and a malicious caller.

5. The method of claim 1, wherein each of the object descriptors includes a tag, access rights, object size, and a pointer.

6. The method of claim 1, wherein a register includes a tag that indicates whether the register is initialized, not initialized, or stores an object descriptor.

7. A system, comprising:
at least one processor;
at least one memory component responsive to the at least one processor; and
instructions in the at least one memory component, wherein the instructions, when executed by the at least one processor, enable the system to perform operations comprising:
determining whether tagged memory is available, wherein the tagged memory comprises tags associated with portions of the tagged memory;
determining whether an Extensible Firmware Interface (EFI) system is implemented;
in response to determining that the EFI system is implemented:
allocating object descriptors for EFI runtime code and data in the tagged memory; and
providing one or more call points from non-tagged memory to the tagged memory for use at runtime; and
during run-time, using the object descriptors associated with the tagged memory to determine whether a non-firmware agent may access the tagged memory storing the EFI runtime code and data.

8. The system of claim 7, wherein the instructions further enable the system to perform operations comprising:
determining that the non-firmware agent is attempting to access the tagged memory; and
in response to determining that the non-firmware agent may access the tagged memory, processing an access operation from the non-firmware agent.

9. The system of claim 8, wherein the instructions further enable the system to perform operations comprising:
in response to determining that the non-firmware agent may not access the tagged memory, blocking access to the tagged memory by the non-firmware agent.

10. The system of claim 9, wherein the non-firmware agent comprises one of an errant caller and a malicious caller.

11. The system of claim 7, wherein each of the object descriptors includes a tag, access rights, object size, and a pointer.

12. The system of claim 7, wherein a register includes a tag that indicates whether the register is initialized, not initialized, or stores an object descriptor.

13. An article of manufacture comprising:
a non-transitory machine readable medium; and
instructions in the non-transitory machine readable medium that, when executed by a machine, cause the machine to perform operations comprising:
determining whether tagged memory is available, wherein the tagged memory comprises tags associated with portions of the tagged memory;
in response to determining that tagged memory is available, determining whether an Extensible Firmware Interface (EFI) system is implemented;
in response to determining that the EFI system is implemented:
allocating object descriptors for EFI runtime code and data in the tagged memory; and
providing one or more call points from non-tagged memory to the tagged memory for use at runtime; and
during run-time, using the object descriptors associated with the tagged memory to determine whether the non-firmware agent may access the tagged memory storing the EFI runtime code and data.

14. An article of manufacture according to claim 13 wherein the instructions further enable the machine to perform operations comprising:
determining that a non-firmware agent is attempting to access the tagged memory; and
in response to determining that the non-firmware agent may access the tagged memory, processing an access operation from the non-firmware agent.

15. An article of manufacture according to claim 14 wherein the instructions further enable the machine to perform operations comprising:
in response to determining that the non-firmware agent may not access the tagged memory, blocking access to the tagged memory by the non-firmware agent.

16. An article of manufacture according to claim 15, wherein the non-firmware agent comprises one of an errant caller and a malicious caller.

17. An article of manufacture according to claim 13, wherein each of the object descriptors includes a tag, access rights, object size, and a pointer.

18. An article of manufacture according to claim 13, wherein a register includes a tag that indicates whether the register is initialized, not initialized, or stores an object descriptor.

* * * * *